United States Patent
Foitzik et al.

(10) Patent No.: US 9,037,374 B2
(45) Date of Patent: May 19, 2015

(54) METHOD FOR BRAKING INTENTION DETECTION, DEVICE FOR BRAKING INTENTION DETECTION FOR A BRAKING SYSTEM OF A VEHICLE, AND SENSORS FOR A BRAKING SYSTEM OF A VEHICLE

(71) Applicants: Bertram Foitzik, Ilsfeld (DE); Dirk Mahnkopf, Eglosheim (DE)

(72) Inventors: Bertram Foitzik, Ilsfeld (DE); Dirk Mahnkopf, Eglosheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/165,756

(22) Filed: Jan. 28, 2014

(65) Prior Publication Data
US 2014/0214297 A1    Jul. 31, 2014

(30) Foreign Application Priority Data
Jan. 29, 2013    (DE) .......................... 10 2013 201 374

(51) Int. Cl.
  G06F 7/70      (2006.01)
  B60T 8/171     (2006.01)
  B60T 7/04      (2006.01)
  B60T 13/575    (2006.01)
  B60T 13/74     (2006.01)

(52) U.S. Cl.
  CPC ................. B60T 8/171 (2013.01); B60T 7/042 (2013.01); B60T 13/575 (2013.01); B60T 13/745 (2013.01)

(58) Field of Classification Search
None
See application file for complete search history.

(56) References Cited

U.S. PATENT DOCUMENTS

| | | | |
|---|---|---|---|
| 2013/0184953 A1* | 7/2013 | Morishita | 701/70 |
| 2013/0244834 A1* | 9/2013 | Tsumori et al. | 477/203 |
| 2014/0011630 A1* | 1/2014 | Takahashi | 477/4 |
| 2014/0180518 A1* | 6/2014 | Hayashi | 701/22 |

FOREIGN PATENT DOCUMENTS

DE    10 2010 031 063    1/2012

* cited by examiner

*Primary Examiner* — Thomas Tarcza
*Assistant Examiner* — Adam Alharbi
(74) *Attorney, Agent, or Firm* — Kenyon & Kenyon LLP

(57) ABSTRACT

A method for detecting a braking intention in a vehicle includes: establishing at least one setpoint braking power for the braking intention specified by a driver and/or an automatic vehicle control system; and taking at least one ascertained sensor variable into consideration. The sensor variable includes: a variable regarding a position and/or an adjustment travel of an output rod of the braking system, a position and/or an adjustment travel of a booster body of the braking system, a position and/or an adjustment travel of a timing case of the braking system, a position, an adjustment travel and/or a rotation angle of a component of a motor of an electromechanical brake booster, a position, an adjustment travel and/or a rotation angle of a component of a thread of the brake booster, and/or a shape and/or a deformation of a reaction disk of the braking system.

10 Claims, 2 Drawing Sheets

METHOD FOR BRAKING INTENTION DETECTION, DEVICE FOR BRAKING INTENTION DETECTION FOR A BRAKING SYSTEM OF A VEHICLE, AND SENSORS FOR A BRAKING SYSTEM OF A VEHICLE

BACKGROUND OF THE INVENTION

1. Field of the Invention

The present invention relates to a device for braking intention detection for a braking system of a vehicle. The present invention also relates to sensors for a braking system of a vehicle and to a braking system for a vehicle.

2. Description of the Related Art

Published German patent application document DE 10 2010 031 063 A1 describes a sensor device for a pedal which is designed to ascertain at least one variable regarding a position and/or a position change of an input rod, which is situated on the pedal and may be put at least into a rotary motion via an actuation of the pedal, in relation to a predefined spatial direction. The pedal may in particular be designed as a brake pedal of a vehicle.

BRIEF SUMMARY OF THE INVENTION

The present invention allows a braking intention detection based on a noticed position change of the output rod, of the booster body, of the timing case, of at least one component of the motor and/or of the thread of the electromechanical brake booster and/or of the deformation of the reaction disk. The present invention thus offers an alternative to the conventional braking intention detection by ascertaining a position change of an input rod. While an input rod travel by which an input rod is adjusted generally represents a braking intention of the driver, considerable deviations may exist between a position of the input rod/an input rod travel and a position of the output rod/an output rod travel. It is not the input rod travel, but the output rod travel which more accurately corresponds to an adjustment travel/actuating path of at least one piston of a master brake cylinder.

For example, the at times considerable deviations between the position of the input rod/the input rod travel and the position of the output rod/the output rod travel may occur due to mass inertias of components of a motor and/or of a gear mechanism of an electromechanical brake booster. The boosting characteristic of the brake booster, such as a boost factor, a jump-in function and/or a jump-in point behavior, for example, may also contribute to the at times considerable deviations and cause the input rod to sometimes be adjusted more quickly and/or more slowly than the output rod. An operation of the brake booster after a run out point may cause the input rod to move more quickly than the output rod during a transition into the run out point, whereby the reaction disk is pressed in. Moreover, an operation of the hydraulics of the braking system, such as in particular of an ESP system, may result in the input rod being "caused to follow" a setting of the driver braking intention.

It is apparent already from the enumeration of the possible causes for the at times considerable deviations between the position of the input rod/the input rod travel and the position of the output rod/the output rod travel that a comparatively large number of exceptions must be taken into consideration, if the braking intention detection is to be carried out based on the position of the input rod/the input rod travel.

As compared to the related art, the present invention offers a braking intention detection based on at least one ascertained (physical) variable which represents the braking intention of the driver and/or of the automatic vehicle control system at any point in time, without necessitating a case-by-case distinction when establishing the setpoint braking power.

It is also pointed out that the present invention not only ensures a braking intention detection using driver observation, but also a braking intention detection using system observation. In this way, an external braking intention, which is specified by the automatic vehicle control system, may also automatically be noticed during the braking intention detection. The present invention is suitable for cooperating with a plurality of automatic vehicle control systems, such as an ACC system and/or an automatic emergency braking system.

The subject matters of the present invention may advantageously be used for a hybrid or electric vehicle. However, it is pointed out that the usability of the subject matters of the present invention is not limited to one particular vehicle type. The subject matters of the present invention may in particular also be used for a braking system having no controllable or regulatable brake booster/electromechanical brake booster. The present invention may still be used even in this case, for example, by ascertaining and taking into consideration only the position and/or the adjustment travel of the output rod of the braking system as a variable for establishing the at least one setpoint braking power.

In one advantageous specific embodiment, the at least one setpoint braking power is established exclusively by taking the at least one variable into consideration. In this way, an ascertainment of the position of the input rod/of the input rod travel may be dispensed with for establishing the at least one setpoint braking power.

For example, a setpoint braking force to be applied to at least one wheel of the vehicle, a setpoint braking torque to be applied to the at least one wheel, a setpoint deceleration of the vehicle and/or a setpoint brake pressure to be set in at least one wheel brake cylinder/in at least one wheel brake of the braking system may be established as the at least one setpoint braking power. The present invention is thus suited for establishing a plurality of setpoint braking powers with the aid of which a braking intention is definable/requestable.

In one advantageous specific embodiment of the method, the at least one variable regarding the position and/or the adjustment travel of the output rod is measured with the aid of an output rod path sensor situated on and/or in the output rod. During an operation of the braking system, the output rod presses onto at least one piston of the master brake cylinder and thus ensures the displacement of volume into at least one brake circuit of the braking system. The volume of brake fluid thus displaced into the at least one brake circuit of the braking system generally results directly in the buildup of a friction braking torque of at least one wheel brake connected to the particular brake circuit. The position of the output rod/the output rod travel is thus more advantageous than the position of the input rod/the input rod travel for deriving/detecting the braking intention since the input rod, at least theoretically, is movable without a change in the brake pressure.

As an alternative or in addition, the at least one variable regarding the position and/or the adjustment travel of the booster body may also be measured with the aid of a booster body path sensor situated on and/or in the booster body, and/or the at least one variable regarding the position and/or the adjustment travel of the timing case may be measured with the aid of a timing case path sensor situated on and/or in the timing case. The adjustment travel of the booster housing and/or of the timing case is/are also variables which correspond to the position of the output rod/the output rod travel with relatively good accuracy. The advantages enumerated in the preceding paragraph are thus also ensured when taking such a variable into consideration for establishing the at least one setpoint braking power.

The at least one variable may also be measured as the rotation angle of the at least one component of the motor of the electromechanical brake booster with the aid of a rotation angle sensor situated on and/or in the motor of the electromechanical brake booster. Moreover, the at least one variable regarding the position and/or the rotation angle of the at least one component of the thread may be measured with the aid of a thread rotation angle sensor situated on and/or in the thread of the electromechanical brake booster. The present invention thus makes it possible to use a plurality of advantageously situatable sensors for establishing the at least one setpoint braking power. In particular sensors which are frequently already used in a braking system may be resorted to for this purpose.

The above-described advantages are also ensurable with the aid of a corresponding device for the braking intention detection for a braking system of a vehicle.

In one advantageous specific embodiment, the evaluation device is additionally designed to establish the one setpoint braking power exclusively by taking the at least one provided variable into consideration. This establishment may be carried out without the evaluation device making case-by-case distinctions, since the at least one provided variable always corresponds to an actuating path of at least one piston of the master brake cylinder with comparatively high probability.

In one further advantageous specific embodiment, the evaluation device is additionally designed to establish a setpoint braking force to be applied to at least one wheel of the vehicle, a setpoint braking torque to be applied to the at least one wheel, a setpoint deceleration of the vehicle and/or a setpoint brake pressure to be set in at least one wheel brake cylinder/one wheel brake of the braking system as the at least one setpoint braking power. The device for braking intention detection is thus also suitable for establishing a plurality of setpoint braking powers, which reliably reflect the braking intention of the driver and/or of the automatic vehicle control system.

The above-described advantages are also achievable with the aid of an output rod path sensor for a braking system of a vehicle for cooperation with the device, the path sensor being situated or situatable on and/or in an output rod and designed to ascertain a position and/or an adjustment travel of the output rod.

This also applies to a booster body path sensor for a braking system of a vehicle for cooperation with the device, the path sensor being situated or situatable on and/or in a booster body and designed to ascertain a position and/or an adjustment travel of the booster body.

This also applies to a timing case path sensor for a braking system of a vehicle for cooperation with the device, the path sensor being situated or situatable on and/or in a timing case and designed to ascertain a position and/or an adjustment travel of the timing case.

This further applies to a thread rotation angle sensor for a braking system of a vehicle for cooperation with the device, the rotation angle sensor being situated or situatable on and/or in a thread of an electromechanical brake booster and designed to ascertain a position angle and/or a rotation angle of at least one component of the thread.

The braking system for a vehicle having a corresponding device and/or at least one such sensor also makes the above-described advantages possible.

DETAILED DESCRIPTION OF THE INVENTION

Figure 1:
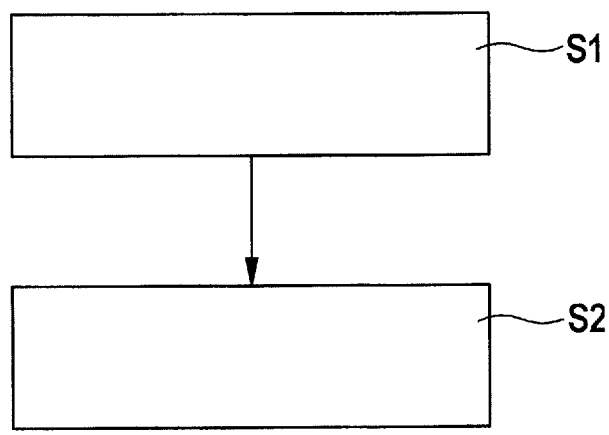
FIG. 1 shows a flow chart to explain one specific embodiment of the method for braking intention detection.

FIG. 1 shows a flow chart to explain one specific embodiment of the method for braking intention detection.

In a method step S1, at least one variable/sensor variable regarding a position/an adjustment travel of an output rod of a braking system of a vehicle, a position/an adjustment travel of a booster body of the braking system, a position/an adjustment travel of a timing case (valve body, valve housing) of the braking system, a position/an adjustment travel and/or a position/a rotation angle of at least one component of a motor of an electromechanical brake booster of the braking system, a position/an adjustment travel and/or a position/a rotation angle of a thread of the electromechanical brake booster and/or a shape/a deformation of a reaction disk of the braking system is/are ascertained/measured. The at least one variable/sensor variable may, for example, be the position/the adjustment travel of the output rod, the position/the adjustment travel of the booster body, the position/the adjustment travel of the timing case, the position/the adjustment travel and/or the position angle/the rotation angle of at least one component of the motor of the electromechanical brake booster, the position/the adjustment travel and/or the position angle/the rotation angle of at least one component of the thread of the electromechanical brake booster and/or shape information of the shape/shape change information of the deformation of the reaction disk. The variables/sensor variables enumerated in the previous sentence may be ascertained/measured in relation to a starting position of the output rod, of the booster body, of the timing case, of the at least one component of the motor, of the at least one component of the thread and/or of the reaction disk. The output rod, the booster body, the timing case, the at least one component of the motor, the at least one component of the thread and/or the reaction disk is/are preferably present in the particular starting position during a non-actuation of an assigned brake actuating element (e.g., of a brake pedal).

Instead of the above-enumerated absolute values, the at least one variable/sensor variable may also be a corresponding signal of a sensor which is specifically designed/situated to monitor the output rod, the booster body, the timing case, the at least one component of the motor, the at least one component of the thread and/or the reaction disk. Method step S1 may thus be defined as an ascertainment of the instantaneous position/a position change of the output rod, of the booster body, of the timing case, of the at least one component of the motor, of the at least one component of the thread and/or of the reaction disk.

For example, the at least one variable/sensor variable regarding the position/the adjustment travel of the output rod is measured in method step S1 with the aid of at least one output rod path sensor situated on and/or in the output rod. The adjustment travel of the output rod/the output rod travel $s_{out}$ corresponds relatively precisely to a volume V which is displaced from the master brake cylinder into at least one connected brake circuit. The volume V displaced from the master brake cylinder into the at least one brake circuit is defined according to the following equation (Eq. 1):

$$V = s_{HZ} * A_{HZ}, \qquad \text{(Eq. 1)}$$

$s_{HZ}$ being an actuating path/adjustment travel of at least one piston of the master brake cylinder, and $A_{HZ}$ being a master brake cylinder surface (of the particular piston).

In general, the following equation (Eq. 2) applies to the adjustment travel of the output rod/the output rod travel $s_{out}$, where:

$$s_{HZ} = s_{out}. \quad (Eq.\ 2)$$

As a result, the following equation (Eq. 3) may be derived for the volume V displaced from the master brake cylinder into the at least one brake circuit:

$$V = s_{out} * A_{HZ}. \quad (Eq.\ 3)$$

A (virtual) pressure p present in a brake circuit is generally a function of the volume V which is displaced from the master brake cylinder into the at least one brake circuit, where:

$$p = f(V), \quad (Eq.\ 4)$$

the (virtual) pressure p being able to be derived from the pressure-volume characteristic of the braking system. This characteristic may also be measured as a characteristic pressure-volume curve and be used for a braking intention estimation. A characteristic pressure-volume curve frequently has a hysteresis, both the function f(V) in the actuating direction and the function f(V) in the release direction being reliably ascertainable.

Based on the (virtual) pressure p, for example, it is also possible to derive an (individual) friction braking torque Mr which is applied to the wheel brake connected to the particular brake circuit according to equation (Eq. 5), where:

$$Mr = cp * p, \quad (Eq.\ 5)$$

factor cp representing a relation between the (virtual) pressure p and the resulting friction braking torque Mr. Factor cp may be wheel-individual or axle-individual. As an alternative, however, factor cp may also be identical for all wheel brakes of the vehicle.

The (individual) friction braking torque Mr may be converted in the corresponding fashion into an (individual) friction braking force which is applied to the particular wheel. The resulting deceleration is derivable from the (individual) friction braking forces of all wheels and the mass of the vehicle. The adjustment travel of the output rod/the output rod travel $s_{out}$ is thus a variable/sensor variable based on which a setpoint braking force to be applied to at least one wheel of the vehicle (corresponding to the individual friction braking force/total friction braking force), a setpoint braking torque to be applied to the at least one wheel (corresponding to the individual friction braking torque Mr/total friction braking torque), a setpoint deceleration of the vehicle and/or a setpoint brake pressure to be set in at least one wheel brake cylinder/one wheel brake of the braking system (corresponding to the virtual pressure p) may be reliably calculated. Output rod travel $s_{out}$ thus also corresponds to the braking intention specified by a driver or an automatic control system.

As described above, the setpoint braking force, the setpoint braking torque, the setpoint deceleration of the vehicle and/or the setpoint brake pressure may be derived from output rod travel $s_{out}$ with the aid of simple calculation steps. In contrast, during braking of a vehicle, situations frequently occur in which the adjustment travel of the input rod/input rod travel may hardly be used, or may be used only with complex calculations/evaluation steps, to establish the braking intention. For example, during a braking intention recognition based on the input rod travel, the mass inertias of components of the motor of an electromechanical brake booster and/or of the gear mechanism of the electromechanical brake booster, the boosting characteristic of the brake booster and/or a possible free travel must also be taken into consideration. In addition, it must be taken into consideration that a braking specification by an automatic vehicle control system, such as an ACC system and/or an automatic emergency braking system, generally has no effect on the input rod travel. Nevertheless, it is necessary to respond quickly and reliably to the braking specification of the automatic vehicle control system. Moreover, an operation of the hydraulics of the braking system, such as in particular of an ESP system, may result in the input rod being "caused to follow" a setting of the driver braking intention.

A braking intention detection taking output rod travel $s_{out}$ into consideration may thus be carried out more easily, more quickly and more reliably than a braking intention detection taking the input rod travel into consideration. Moreover, more cost-effective electronics requiring less installation space may be used for the braking intention detection taking output rod travel $s_{out}$ into consideration.

As an alternative or in addition to the above-described procedure, it is also possible in method step S1 to measure the at least one variable/sensor variable regarding the position/the adjustment travel of the booster body and/or the position/the adjustment travel of the timing case with the aid of at least one booster body path sensor situated on and/or in the booster body and/or at least one timing case path sensor situated on and/or in the timing case.

The adjustment travel of the booster body/booster body travel $s_{BB}$ and the adjustment travel of the timing case/timing case travel $s_{VB}$ are in relation to the adjustment travel of the output rod/the output rod travel $s_{out}$, which is independent of a position/an adjustment travel of an input rod. The causes already mentioned above for possible deviations between the input rod travel and output rod travel $s_{out}$ thus need not be taken into consideration for a braking intention detection taking the booster body travel $s_{BB}$ and/or the timing case travel $s_{VB}$ into consideration. In general, the following equation (Eq. 6) applies to the adjustment travel of the booster body/the booster body travel $s_{BB}$, where:

$$s_{BB} = s_{out} + \Delta. \quad (Eq.\ 6)$$

In this way, only deformation $\Delta$ of the reaction disk may result in deviations between output rod travel $s_{out}$ and booster body travel $s_{BB}$. For the adjustment travel of the timing case/the timing case travel $s_{VB}$ the following equation (Eq. 7) applies accordingly, where:

$$s_{VB} = s_{out} + \Delta. \quad (Eq.\ 7)$$

Deformation $\Delta$ of the reaction disk may be derived from a force balance according to the following equation (Eq. 8), where:

$$Fp + Fhz = Fu + Fe, \quad (Eq.\ 8)$$

Fp being a master brake cylinder internal pressure-induced return force, Fhz being the spring force of the master brake cylinder suspension, Fu being a supporting force provided by the electromechanical brake booster, and Fe being a force that is potentially applied to the reaction disk by the input rod/a driver braking force as a so-called input rod force.

In general, an elasticity k of the reaction disk may be assumed to be constant. Elasticity k of the reaction disk is generally known. In particular a hydraulic substitute model may be created for the reaction disk, in which the reaction disk behaves in the manner of a liquid-filled component having an arbitrarily shapeable outer contour. Deformation $\Delta$ of the reaction disk results according to this substitute model according to the following equation (Eq. 9), where:

$$\Delta = (Fe - \eta * Fu) * x / k, \quad (Eq.\ 9)$$

η being the force ratio factor between input rod force Fe and supporting force Fu, and x being the quotient of a cross-sectional surface $A_D$ of the reaction disk and a cross-sectional surface $A_d$ of the input rod (see FIG. 2), where:

$$x = A_D/A_d \tag{Eq. 10}$$

The equation (Eq. 9) applies in particular to linear boosts with a movement of the booster body/of the timing case adapted to a movement of the input rod. Moreover, the equation (Eq. 9) may be simplified in the so-called jump-in range since input rod force Fe is equal to zero due to a present free travel/a present gap between the input rod and the reaction disk.

The adjustment travel of the booster body/booster body travel $s_{BB}$ and the adjustment travel of the timing case/timing case travel $s_{VB}$ are thus also variables/sensor variables which reliably reflect a braking intention of a driver or of an automatic vehicle control system.

To carry out method step S1, the at least one variable/sensor variable may also be measured as the rotation angle of the at least one component of the motor of the electromechanical brake booster with the aid of a rotation angle sensor situated on and/or in the motor of the electromechanical brake booster. In general, e.g., an interference-free relation exists between the rotation angle Φ of the rotor of the motor of the electromechanical brake booster and the adjustment travel of the booster body/booster body travel $s_{BB}$ according to the following equation (Eq. 11), where:

$$s_{BB} = i*(\Phi - M_L*k_G), \tag{Eq. 11}$$

i being a gear ratio, $k_G$ being a gear elasticity, and $M_L$ being a motor load.

For the adjustment travel of the timing case/timing case travel $s_{VB}$ the following equation (Eq. 12) applies accordingly, where:

$$s_{VB} = i*(\Phi - M_L*k_G). \tag{Eq. 12}$$

For this reason, the ascertained rotation angle Φ of the rotor of the motor is suitable for the reliable braking intention detection with comparatively small deviations. This advantage frequently also applies to an ascertained rotation angle of at least one other component of the motor and to an ascertained rotation angle of at least one component of a thread of the electromechanical brake booster, which is measurable with the aid of a sensor situated on and/or in the thread, e.g., a thread rotation angle sensor.

As an alternative or in addition, at least one position/at least one adjustment travel of at least one component of the motor of the electromechanical brake booster and/or of at least one component of the thread of the electromechanical brake booster may also be measured and used for reliable braking intention detection.

Method step S1 thus offers a plurality of different implementation options. It is possible in particular to select the sensor whose arrangement is the easiest and/or which is the most cost-effective from a plurality of usable sensors to carry out method step S1.

In a method step S2, at least one setpoint braking power with respect to a braking intention specified by the driver of the vehicle and/or by the automatic vehicle control system of the vehicle is established taking the at least one ascertained variable/sensor variable into consideration. The at least one setpoint braking power may in particular be established exclusively taking the at least one variable/sensor variable into consideration, without using a further measuring variable, such as in particular the adjustment travel of the input rod/input rod travel.

For example, a setpoint braking force to be applied to at least one wheel of the vehicle, a setpoint braking torque to be applied to the at least one wheel, a setpoint deceleration of the vehicle and/or a setpoint brake pressure to be set in at least one wheel brake cylinder/one wheel brake of the braking system may be established as the at least one setpoint braking power. The method may thus be used to establish a plurality of different specification variables.

The method offers a way for detecting the braking intention, regardless of whether the driver initiates the braking process or whether the automatic vehicle control system has a braking intention implemented by the electromechanical brake booster. Instead of a driver observation, the method thus offers the more advantageous system observation, which includes an automatic and indirect co-observation of the (potentially present) vehicle control system. However, the ability to carry out the method is not limited to a vehicle having a vehicle control system, such as an ACC system and/or an emergency braking system.

It is pointed out that the characteristic of the electromechanical brake booster, e.g., regarding its jump-in behavior (jump-in function) and/or its boosting, is also subsequently modifiable with the aid of a device designed for this purpose when using the method, without this having any effects on the usability of the device. The device designed for carrying out the method may thus also be used for a plurality of different electromechanical brake boosters having different characteristics. In particular no deviations whatsoever occur in the flow of the method when the method is carried out on different electromechanical brake boosters.

With a conventional braking intention detection taking the adjustment travel of the input rod/the input rod travel into consideration, it must be kept in mind that while quickly varying modulations on the brake actuating element (e.g., a brake pedal) change the position of the input rod/the input rod travel, they result in a change of the pressure present in the master brake cylinder only to the degree of the implementable dynamics of the electromechanical brake booster. In contrast, complex misuse recognitions are dispensed with when carrying out the above-described method. This may also be described in such a way that the method includes features of a mechanically implemented low-pass filter, due to the limited follow-up ability of few components of the electromechanical brake booster.

In one refinement of the method, at least one electric motor may be controlled in such a way that it is used to decelerate the vehicle, taking the at least one setpoint braking force established during the braking intention detection into consideration. In this way, in particular a generator operation of the electric motor may be caused, with the aid of which a vehicle battery is chargeable. (In parallel to this, at least one hydraulic component of the braking system may be controlled in such a way that a brake pressure buildup in at least one wheel brake is prevented.) The method may thus also contribute to reducing a fuel consumption and/or a harmful substance emission while the vehicle is being driven. In particular an optimal utilization of the recuperation possibilities of hybrid and electric vehicles may be implemented with the aid of the method.

Figure 2:
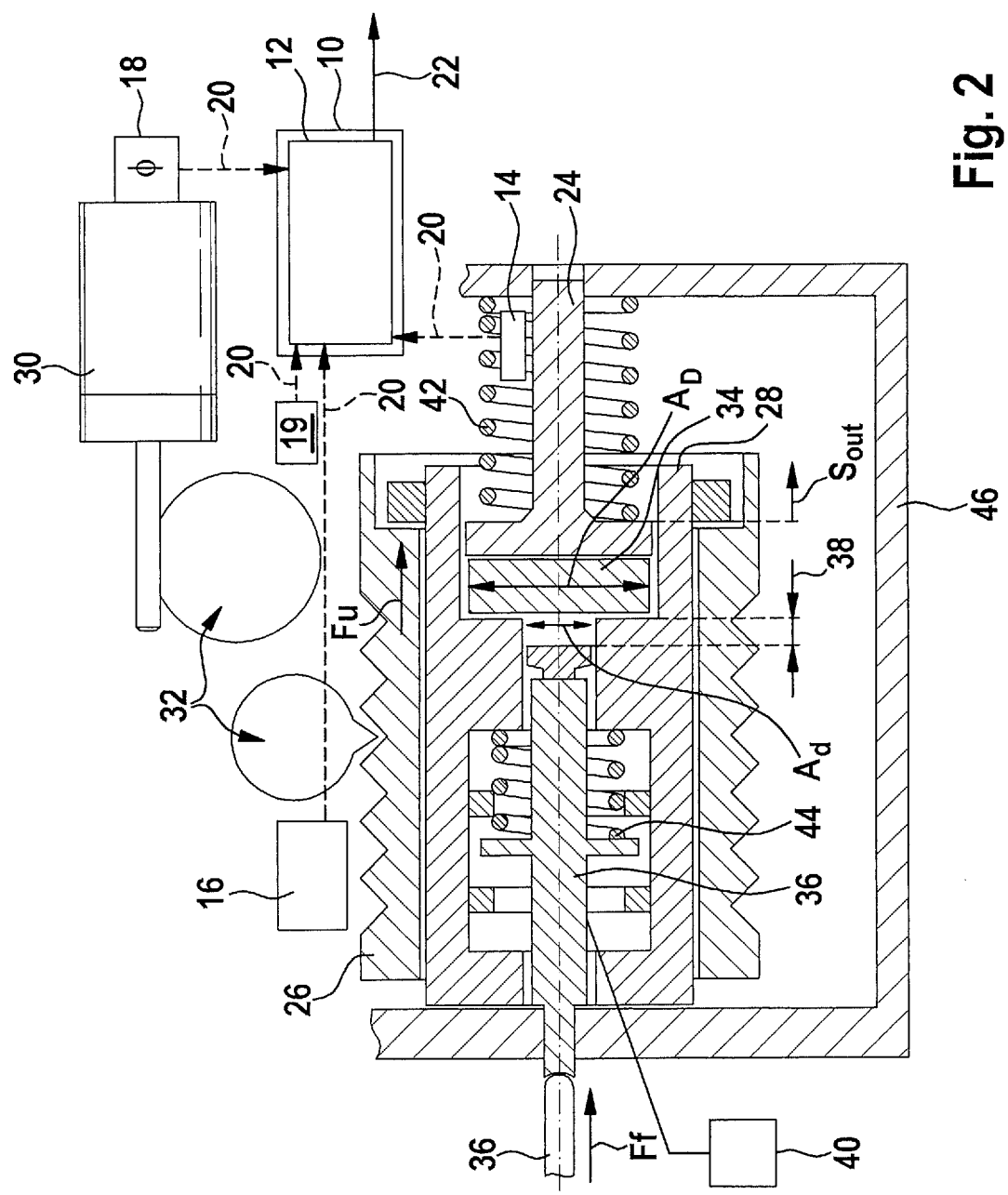
FIG. 2 shows a schematic illustration of one specific embodiment of the device for braking intention detection.

FIG. 2 shows a schematic illustration of one specific embodiment of the device for braking intention detection.

Device 10 for braking intention detection shown schematically in FIG. 2 is not only designed to cooperate with the braking system, which is shown partially. It is expressly pointed out that device 10 is usable for a plurality of different braking systems.

Device 10 may be integrated into an electronic control unit, such as a brake booster control unit, or into an ESP control unit. Other types of control units which are usable in a vehicle may also be designed to carry out the functions of (integrated) device 10 described hereafter. As an alternative, however, device 10 may also be designed as a dedicated structural unit.

Device 10 includes an evaluation device 12, which is designed to establish at least one setpoint braking power with respect to a braking intention specified by a driver of the vehicle equipped with the braking system and/or by an automatic vehicle control system of the vehicle, taking at least one sensor variable/variable 20 which is provided by at least one external or internal sensor 14 through 19 into consideration. For example, evaluation device 12 may be designed to establish a setpoint braking force to be applied to at least one wheel of the vehicle, a setpoint braking torque to be applied to the at least one wheel, a setpoint deceleration of the vehicle and/or a setpoint brake pressure to be set in at least one wheel brake cylinder/one wheel brake of the braking system as the at least one setpoint braking power. Thereafter, the evaluation device may output at least one output signal 22 which corresponds to the at least one established setpoint braking variable. The at least one output signal 22 may be used by a receiver, for example, to control at least one hydraulic component of the braking system and/or at least one electric motor of the vehicle which is usable as a generator. However, the usability of the at least one output signal 22 is not limited to the examples described here.

Evaluation device 12 is designed to establish the at least one setpoint braking power taking into consideration at least one variable, provided as sensor variable 20, regarding a position/an adjustment travel of an output rod 24 of the braking system, a position/an adjustment travel of a booster body 26 of the braking system, a position/an adjustment travel of a timing case 28 (valve body, valve housing) of the braking system, a position/an adjustment travel and/or a position/a rotation angle of at least one component of a motor 30 of an electromechanical brake booster of the braking system, a position/an adjustment travel and/or a position/a rotation angle of at least one component of a thread 32 of the electromechanical brake booster and/or a shape/a deformation of a reaction disk 34 of the braking system.

Device 10 is thus also usable without a sensor for ascertaining an (absolute) position/an (absolute) adjustment travel of an input rod 36 of the braking system. The use of device 10 is thus associated with lower manufacturing costs of the cooperating braking system. The braking system of FIG. 2 thus has only one differential path sensor 40, which conventionally is already frequently used to establish supporting force Fu and/or to control motor 30 of the electromechanical brake booster. Moreover, the evaluation of the at least one sensor variable 20 performed by evaluation device 12 may be carried out without having to take a potentially present free travel 38 into consideration. The use of device 10 also ensures the advantages already described above, the renewed description of which is dispensed with here.

In one advantageous specific embodiment, device 10 may cooperate with an output rod path sensor 14, which is situated/situatable on and/or in output rod 24 and designed to ascertain the position/the adjustment travel of output rod 24 (output rod travel $s_{out}$) or a corresponding physical variable. As an alternative or in addition, device 10 may also cooperate with a booster body path sensor 16, which is situated/situatable on and/or in booster body 26 and designed to ascertain the position/the adjustment travel of booster body 26 (booster body travel $s_{BB}$) or a corresponding physical variable. In corresponding fashion, device 10 may also cooperate with a timing case path sensor (not shown), which is situated/situatable on and/or in timing case 28 and designed to ascertain the position/the adjustment travel of timing case 28 (timing case travel $s_{VB}$) or a corresponding physical variable. Booster body travel $s_{BB}$ and/or timing case travel $s_{VB}$ reliably reflect the braking intention of the driver/of the automatic vehicle control system. Even if booster body 26/timing case 28 assumes a position which cannot be exclusively attributed to the implementation of a braking intention, which is the case, for example, during the compensation of a change of driver braking force Ff during a transition above the jump-in range, these influences are easily correctable.

A cooperation of device 10 with a motor rotation angle sensor 18 is also possible, which is situated/situatable on and/or in motor 30 of the electromechanical brake booster and which is designed to ascertain rotation angle $\Phi$ of the rotor of motor 30 of the electromechanical brake booster. The braking intention is also reliably detectable from rotation angle $\Phi$ of the rotor of motor 30, which clearly defines the position of booster body 26. When device 10 is used, it is thus possible to use a sensor type which conventionally is already frequently installed/situated on an electromechanical brake booster.

Moreover, device 10 may cooperate with a thread rotation angle sensor 19, which is situated/situatable on and/or in thread 32 of the electromechanical brake booster and which is designed to ascertain the instantaneous position angle/the rotation angle of at least one component of thread 32 of the electromechanical brake booster.

In one refinement, at least one of sensors 14 through 19 may be integrated into device 10. However, device 10 may also be designed to cooperate with at least one sensor 14 through 19 situated separately therefrom.

It is pointed out once again that the usability of device 10 is not limited to one particular type of the electromechanical brake booster or of the braking system. The ratio between cross-sectional surface $A_D$ of reaction disk 34 and of a cross-sectional surface $A_d$ of input rod 36 is thus freely selectable. Return springs 42 and 44 and housing 46 are thus also not addressed in greater detail here.

While device 10 and the method for braking intention detection are described above with respect to a braking system equipped with an electromechanical brake booster, the usability of these subject matters is not limited to such a braking system. Instead, device 10 and the method for braking intention detection may also be applied to a braking system having no brake booster or to a braking system having a different brake booster type.

What is claimed is:

1. A method for detecting a braking intention, comprising:
ascertaining at least one sensor variable; and
establishing at least one setpoint braking power with respect to a braking intention specified by at least one of (i) a driver of a vehicle having a braking system and (ii) by an automatic vehicle control system of the vehicle, taking the at least one ascertained sensor variable into consideration;
wherein the at least one sensor variable includes:
a variable regarding at least one of a position and an adjustment travel of an output rod of the braking system;
a variable regarding at least one of a position and an adjustment travel of a booster body of the braking system;
a variable regarding at least one of a position and an adjustment travel of a timing case of the braking system;
a variable regarding at least one of a position, an adjustment travel, and a rotation angle of at least one component of a motor of an electromechanical brake booster of the braking system;

a variable regarding at least one of a position, an adjustment travel, and a rotation angle of at least one component of a thread of the electromechanical brake booster of the braking system; and a variable regarding at least one of a shape and a deformation of a reaction disk of the braking system; and wherein the at least one setpoint braking power is established exclusively by taking the at least one variable into consideration and wherein the at least one setpoint braking power includes at least one of:

a setpoint braking force to be applied to at least one wheel of the vehicle;

a setpoint braking torque to be applied to the at least one wheel;

a setpoint deceleration of the vehicle; and a setpoint brake pressure to be set in at least one wheel brake cylinder of the braking system.

2. The method as recited in claim 1, wherein the variable regarding at least one of the position and the adjustment travel of the output rod is measured with the aid of an output rod path sensor situated at least one of on and in the output rod.

3. The method as recited in claim 1, wherein at least one of: the variable regarding the at least one of the position and the adjustment travel of the booster body is measured with the aid of a booster body path sensor situated at least one of on and in the booster body; and the variable regarding the at least one of the position and the adjustment travel of the timing case is measured with the aid of a timing case path sensor situated at least one of on and in the timing case.

4. The method as recited in claim 1, wherein the at least one ascertained sensor variable is the rotation angle of the at least one component of the motor of the electromechanical brake booster measured with the aid of a rotation angle sensor situated at least one of on and in the motor of the electromechanical brake booster.

5. The method as recited in claim 1, wherein the at least one ascertained sensor variable is the variable regarding the at least one of the position, the adjustment travel, and the rotation angle of at least one component of the thread of the electromechanical brake booster of the braking system measured with the aid of a thread rotation angle sensor situated at least one of on and in the thread of the electromechanical brake booster.

6. A device for detecting braking intention for a braking system of a vehicle, comprising:

an evaluation device configured to establish at least one setpoint braking power with respect to a braking intention specified by at least one of (i) a driver of a vehicle having a braking system and (ii) by an automatic vehicle control system of the vehicle, taking into consideration at least one sensor variable ascertained by at least one of an external sensor and an internal sensor; wherein the at least one sensor variable includes:

a variable regarding at least one of a position and an adjustment travel of an output rod of the braking system;

a variable regarding at least one of a position and an adjustment travel of a booster body of the braking system;

a variable regarding at least one of a position and an adjustment travel of a timing case of the braking system;

a variable regarding at least one of a position, an adjustment travel, and a rotation angle of at least one component of a motor of an electromechanical brake booster of the braking system;

a variable regarding at least one of a position, an adjustment travel, and a rotation angle of at least one component of a thread of the electromechanical brake booster of the braking system; and a variable regarding at least one of a shape and a deformation of a reaction disk of the braking system; and wherein the evaluation device is configured to establish the at least one setpoint braking power exclusively by taking the at least one sensor variable into consideration and wherein the at least one setpoint braking power established by the evaluation device includes at least one of:

a setpoint braking force to be applied to at least one wheel of the vehicle;

a setpoint braking torque to be applied to the at least one wheel;

a setpoint deceleration of the vehicle; and a setpoint brake pressure to be set in at least one wheel brake cylinder of the braking system.

7. The device as recited in claim 6, wherein an output rod path sensor is provided, the output rod path sensor being (i) situated at least one of on and in the output rod of the braking system and (ii) configured to ascertain the at least one of the position and the adjustment travel of the output rod.

8. The device as recited in claim 6, wherein a booster body path sensor is provided, the booster body path sensor being (i) situated at least one of on and in the booster body and (ii) configured to ascertain the at least one of the position and the adjustment travel of the booster body.

9. The device as recited in claim 6, wherein a timing case path sensor is provided, the path sensor being (i) situated at least one of on and in the timing case and (ii) configured to ascertain the at least one of the position and the adjustment travel of the timing case.

10. The device as recited in claim 6, wherein a thread rotation angle sensor is provided, the rotation angle sensor being (i) situated at least one of on and in the thread of the electromechanical brake booster and (ii) configured to ascertain the at least one of the position angle and the rotation angle of the at least one component of the thread.

* * * * *